Figures 1, 2:
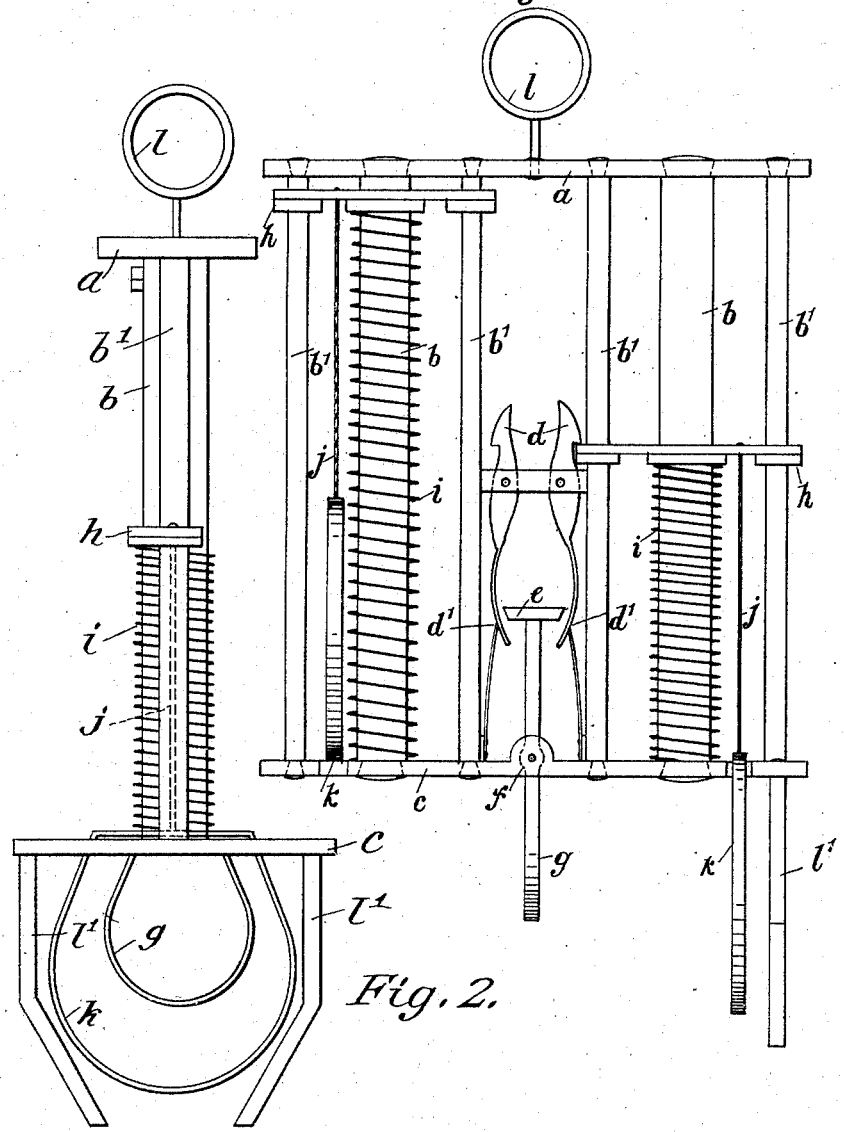

D. MORGAN.
TRAP.
APPLICATION FILED DEC. 30, 1908.

928,395.

Patented July 20, 1909.

Witnesses:-
C. H. Crawford
C. Heymann

Inventor:
David Morgan
by B. Singer
Attorney

UNITED STATES PATENT OFFICE.

DAVID MORGAN, OF LLANGADOCK, ENGLAND.

TRAP.

No. 928,395.  Specification of Letters Patent.  Patented July 20, 1909.

Application filed December 30, 1908. Serial No. 470,001.

*To all whom it may concern:*

Be it known that I, DAVID MORGAN, a subject of His Majesty the King of the United Kingdom of Great Britain and Ireland, residing at Bryncoch, Gwynfa, Llangadock, Wales, in that part of the United Kingdom called England, have invented new and useful Improvements in Traps for Moles and other Animals, of which the following is a specification.

This invention relates to improvements in traps for moles and other animals, the object being to provide a simple, reliable and efficient trap designed to be placed in a likely run and capable of taking the animal from which ever direction it approaches the trap.

In order that this invention may be fully understood it will now be described with reference to the accompanying drawings, in which:—

Figure 1 is a side elevation showing the trap set at one side and not set at the other and, Fig. 2 is an end view.

In practice I provide a frame consisting of a top bar $a$ side bars $b$ and supporting base $c$. The top and base are connected by four other vertical bars $b'$ there being thus three bars on each side of a central space. In the central space are pivoted two vertical catches $d$ one turned to the left and the other to the right, the lower ends of the catches being spring controlled as at $d'$ so as to keep the upper ends normally pressed toward the right and left. The spring controlled ends are bent somewhat toward one another and above and between them is a tee or mushroom headed spindle $e$ arranged to rock on a horizontal pivot $f$ the lower end of the spindle passing through the base and being provided with a loop ring or noose $g$. On each of these bars on each side of the central space is free to run up and down a cross-bar $h$ each bar being kept normally toward the top bar of the frame by a spiral spring $i$. To each of these bars is attached a cord or equivalent $j$ having at its lower end a loop or noose $k$ free to pass up and down through a slot in the base. For convenience in carrying the trap a ring $l$ can be provided at the top.

The trap is put in the likely run of the mole, and the trap set by pressing down the cross-bars so that their inner ends engage with and are held down by the catches $d$ the loops then hanging below the base, as shown at the right hand of Fig. 1. Then, when a mole enters either of the loops, the tee headed spindle is moved outward and the upper end inward and thus release the cross bar on that side whereby the spring will be released, carry up the loop and squeeze the mole between the base and the bottom of the loop. Side arms or legs $l'$ may be provided below the base for supporting the trap in position.

What I claim as my invention and desire to secure by Letters Patent is:—

1. A new or improved trap for moles and other animals comprising upper and lower members, vertical members at each side connecting the same, cross bars free to slide upon the said vertical side members with springs designed to lift them into their raised position, loops, depending from the sliding cross bars, oppositely opposed spring catches for retaining the sliding cross bars in the lowered position for setting the trap and a vertical rocking arm having its upper extremity arranged between the lower extremities of the catches and its lower extremity provided with a loop designed to come into contact with the snout of the animal for releasing one of the catches; substantially as herein described and shown and for the purposes specified.

2. An animal trap comprising in combination, a plurality of loop members provided for passage of the animal therethrough, a frame structure with which said members coact to impinge the animal, independently operable spring actuated devices connected with said loop members for impinging the animal, independent latching devices for said spring actuated devices for locking said spring actuated devices under tension, and a trip member adapted to unlock either or both of said latch devices and provided with a loop portion disposed between said first mentioned loops and adapted for engagement by the animal.

3. An animal trap comprising in combination, a frame structure, vertically movable loops for impinging the animal against the bottom of said frame structure, spring actuated supports for said loops slidably mounted on said frame structure, independent devices for locking said supporting members under tension, and a vertically disposed trip normally out of engagement with said locking devices and provided with a loop upon its lower end adapted to be engaged by the animal to throw either or both of said locking devices out of locking engagement with said supporting members.

In testimony whereof I have signed my name to this specification in the presence of two subscribing witnesses.

DAVID MORGAN.

Witnesses:
I. T. WILLIAMS,
THOS. P. WILLIAMS.